United States Patent Office 2,703,276
Patented Mar. 1, 1955

2,703,276

SOIL-CONDITIONING FERTILIZER

Ross M. Hedrick and Quirino A. Trementozzi, Dayton, Ohio, assignors to Monsanto Chemical Company, St. Louis, Mo., a corporation of Delaware No Drawing. Application October 18, 1952,
Serial No. 315,603

The portion of the term of the patent subsequent to January 13, 1970, has been disclaimed and dedicated to the public

18 Claims. (Cl. 71—1)

This invention relates to methods of simultaneously fertilizing and conditioning soils. More specifically the invention relates to aqueous solutions for improving the physical structure of a soil and at the same time introducing nutrient elements into the soil.

In Serial No. 271,280, filed February 12, 1952, by Ross M. Hedrick and David T. Mowry (now issued as United States Patent 2,625,529), there are described and claimed methods of treating soils with polymeric compounds which have the property of ionizing when contacted with soil moisture, to form macro-molecular ions having a large number of charged sites. It has been demonstrated that these large ions are adsorbed on the fine soil fragments and thereby induce the agglomeration of the fine particles into aggregates of substantial size. The presence of polyelectrolytes affects the ion exchange capacity of the soil and improves the ability of the soil to adsorb and temporarily retain certain nutrient elements. Thus, a more efficient utilization of added fertilizers is possible.

Since many poor soils have low ion-exchange properties, and since the nutrient values of fertilizers may be quickly washed out of the soil by rainfall, it is often desirable to treat the soil with mixtures containing both polyelectrolytes and plant nutrients. When mixed in solid pulverulent state, a definite synergistic action is obtained. When solids are so treated a larger proportion of the nutrient values are assimilated by the plants, probably because of the availability of the nutrient over a longer period of time due to the improved ionic exchange property, and because of the better aeration and moisture retention of the soil. Plant responses to the combined fertilizer and soil conditioner are substantially greater than the sum of the individual effects. The accomplishment of both of the desirable effects by a single operation is such that both the soil conditioning and the fertilizing function are more efficiently performed.

It is frequently convenient to apply fertilizers and conditioning agents in the form of a water solution, since by means of dilute solutions, the conditioning agents and nutrients may be quickly dispersed throughout the cultivated portion of the soil. However, in the preparation of water solutions containing both polyelectrolytes and plant nutrients, deleterious effects are frequently observed, whereby the soil conditioning properties are substantially reduced, and in some cases completely destroyed, by the presence of certain ions. These deleterious effects are not fully understood. It is believed that the ions formed by the dissolution of certain plant nutrients may be reacted with, adsorbed on, or otherwise render the charged sites of the polyelectrolyte incapable of adsorption on soil particles. On the other hand, when fertilizers and polyelectrolytes are added to soils separately either as solutions or as dry powders, or when the fertilizers and polyelectrolytes are mixed in dry form and applied in a single operation, complete intermixing and ionic equilibrium do not take place prior to the adsorption of the polyelectrolytes on the soil. In the latter case substantial adsorption of the polyelectrolyte on the soil may take place before the detrimental ions react to render the polyelectrolytes less effective. As stated above the mechanism of the effect of detrimental ions may involve other complex and unknown phenomena.

It has been found that commercially available mixed fertilizers and many chemical compounds commonly used as plant nutrients reduce, or completely destroy the desirable soil conditioning effects of polyelectrolytes when used together in water solution. Accordingly, it is desirable to carefully select the components of a mixed fertilizer so that the deleterious ions will not be formed when the fertilizer is dissolved in water with the polyelectrolytes. This is the fundamental objective of the present invention. Another purpose of this invention is to provide mixtures of plant nutrients and soil conditioners such that the beneficial ions may off-set the deleterious effect of the detrimental ions. Another purpose of the invention is to provide a composition, by means of which optimum soil conditioning and fertilization are achieved in a single treatment of the soil.

One modification of this invention involves the combination of polyelectrolytes and plant nutrients which are substantially free of chloride, nitrate and sulfate ions. In other words, when the polyelectrolytes are mixed with the common nutrient values, nitrogen, phosphorus and potassium, in the form of potassium phosphates, ammonium phosphates, and ammonium or organic nitrogen, such as urea, instead of the ammonium sulfate, potassium chloride, potassium nitrate and ammonium nitrate, aqueous soil-treating solutions can be prepared without destroying the optimum properties of the soil-conditioning agents.

Useful conditioning agents for the practice of this invention are the water-soluble polymeric polyelectrolytes, especially those having a weight average molecular weight of at least 10,000, and which contain substantially linear continuous carbon chains derived by the polymerization of an aliphatic, unsaturated carbon to carbon double bond. The expression, "water-soluble" is intended to include compounds which form true solutions in either distilled water or in soil water, and also those which swell and become dispersed in aqueous media. The expression, "substantially linear," defines a normal polymer structure as prepared by the polymerization of a monoolefinic monomer and possessing a minimum of cross-linking structures, which tend to render the polymer water-insoluble and reduces its effectiveness as an aggregating agent.

Suitable agents of this class are the copolymers of maleic anhydride, maleic acid, salts of maleic acid, and maleic amides with any copolymerizable monoolefinic monomer, such as vinyl acetate, vinyl alkyl ethers, vinyl chloride and isobutylene, including the alkaline metal, ammonium, and alkaline earth metal salts of said copolymers. Polymers of this type include the partial calcium salts of the copolymer of vinyl acetate and maleic acid, the ammonium salts of the copolymer of isobutylene and maleic acid, and the potassium salts of a copolymer of a vinyl alkyl ether and maleic acid. Other useful polymers are the polymers of acrylic acid, methacrylic acid and derivatives thereof, such as the alkali metal salts, calcium salts, and ammonium salts, and any copolymers of the said acrylic and methacrylic acid derivatives with other monoolefinic compounds copolymerizable therewith. Typical examples of this type are polyacrylic acid, the alkali metal, ammonium and calcium salts of polyacrylic acid, the partial calcium salts, the alkali metal salts, and the ammonium salts of hydrolyzed polyacrylonitrile. A comprehensive enumeration of suitable polyelectrolytes and numerous examples of typical preparations are set forth in the application, Serial No. 271,280, filed February 12, 1952, by Ross M. Hedrick and David T. Mowry (now issued as United States Patent 2,625,529).

The plant nutrients to be combined with the above-mentioned polyelectrolytes should have a substantial proportion of nitrogen, phosphate expressed as $P_2O_5$, and potassium expressed as $K_2O$ which are substantially free of the detrimental ions, chloride, nitrate and sulfate. Thus, any proportions of any one or more of the following commonly available plant nutrients may be used without danger of adversely affecting the polyelectrolytes: $NH_4H_2PO_4$, $(NH_4)_2HPO_4$, $KH_2PO_4$, $K_2HPO_4$, $K_3PO_4$, $Ca(H_2PO_4)_2$, $CaHPO_4$, $Ca(PO_3)_2$, $NaH_2PO_4$, $Na_2HPO_4$, $Na_3PO_4$, $(NH_4)_2CO_3$, $NH_4HCO_3$, $NH_4OH$, $KPO_3$, $NH_4PO_3$, $NH_4H_3P_2O_7$, $(NH_4)_2H_2P_2O_7$, $(NH_4)_4P_2O_7$, $KH_2PO_4 \cdot NH_4H_2PO_4$, $K_4P_2O_7$ and $Na_4P_2O_7$, urea, urea metaphosphate, urea phosphate, and urea pyrophosphate.

Another modification of this invention involves the use of the above-mentioned polyelectrolytes in combination with plant nutrients, so selected and proportioned that the quantity of nitrate present is maintained at a minimum and has a definite relationship to the proportion of phosphate ($P_2O_5$). Since the growth of some plants require nitrogen in the form of nitrate, and since nitrification bacteria are often not active at the temperatures of the soil in the early weeks of the growing season, it is often necessary, or at least beneficial to have some of the nitrogen in the form of nitrate. Only a portion of the nitrogen should be in the form of nitrate and the phosphate ($P_2O_5$) should be present in a very substantial amount. Thus, if the proportion of ($P_2O_5$) by weight is at least four times as great as the quantity of nitrate-nitrogen, the deleterious effect of nitrate will be substantially off-set by the phosphate. If the quantity of phosphate is eight to 25 times the weight of the nitrate-nitrogen, the combined soil conditioner and nutrient will often have a greater soil-conditioning effect than the polyelectrolytes alone. This modification of the invention enables the simultaneous use of nutrients and soil-conditioners in aqueous solutions where nitrate-nitrogen is necessary to the particular crops in the early spring season.

A convenient source of non-nitrate nitrogen is urea which is completely water-soluble and does not have any deleterious effects on the activity of the soil conditioner. Obviously other organic nitrogen compounds which do not ionize in the presence of soil moisture may be used, and also the phosphoric acid derivatives of urea.

The combined fertilizers and polyelectrolyte soil conditioners are adapted for use in aqueous solution where optimum nutrient and soil-conditioning effects are desired. Although the solutions may be applied generally over an entire cultivated area, they are particularly useful where applied in rows where seeds or plants have been established. One convenient and economical method of use is to apply the solution, either continuously or intermittently, from the seed planting machines which are equipped with storage tanks and means for introducing the solution along the row or at the places where seeds are inserted in the soil. Another method of using the fertilizing and soil-conditioning mixture is to pour a quantity of the solution on the soil around a newly transplanted set. By these manners the optimum fertilizing and soil-conditioning effects can be attained at the precise places where the benefits are needed.

The soil-conditioning effect of polyelectrolytes can be very conveniently measured with respect to any soil by means of a standardized wet sieving technique. This measurement is made by preparing soil crumbs in the laboratory using any selected soil and the desired quantity of any polyelectrolyte by mixing the polymer and the soil with a small proportion of water and pressing the mixture through a 4-mm. sieve. The soil crumbs so prepared are then dried for two days in a warm room at low humidity. A 40-gram sample of the soil is placed on the top sieve of a set of three sieves, 0.84 mm., 0.42 mm. and 0.25 mm. arranged in order of decreasing size. The sieves are raised and lowered in water through a distance of 1.5 inches at the rate of 30 cycles per minute for thirty minutes. The quantity of soil remaining on the total of all three sieves represents the percentage of water-stable aggregates.

EXAMPLE 1

To demonstrate the deleterious effects of commercially available fertilizers on polyelectrolytes in water solution, the standard wet sieving technique was used to test the effect of the fertilizers with each of two different polyelectrolytes, the sodium salt of hydrolyzed polyacrylonitrile and the copolymer of vinyl acetate and maleic acid partial methyl ester. The following table sets forth the analysis of the fertilizer in terms of the chemical compounds mixed in the preparation of the fertilizer and demonstrates the soil-conditioning effect and the percentage of decrease when used in combination with the fertilizers in water solution.

Table

| Fertilizer, Percent | Maleic Acid Copolymer (0.02%) | | Sodium Salt of Hydrolyzed Polyacrylonitrile (0.05%) | |
|---|---|---|---|---|
| | Percent Agg. | Percent Decrease | Percent Agg. | Percent Decrease |
| None | 51 | 0 | 58 | 0 |
| $NH_4H_2PO_4$, 43 | | | | |
| Urea, 11 | 44 | 14 | 43 | 26 |
| $KNO_3$ 15 | | | | |
| KCl, 10 | | | | |
| $NaNO_3$ | | | | |
| $NH_4H_2PO_4$, 34 | | | | |
| Urea, 30 | 33 | 25 | 44 | 24 |
| $KNO_3$, 36 | | | | |
| $NH_4H_2PO_4$, 51 | | | | |
| $(NH_4)_2SO_4$, 8 | 42 | 18 | 29 | 50 |
| $KNO_3$, 30 | | | | |
| Triple Super Phosphate, 13 | | | | |
| $(NH_4)_2SO_4$, 6 | 27 | 47 | 13 | 78 |
| $KNO_3$, 41 | | | | |

EXAMPLE 2

Each of a series of commonly used plant nutrient compounds was tested to determine its effect in water solution with each of several polyelectrolytes by means of the wet sieving test. The percentage of water-stable aggregates remaining after the standard wet sieving treatment was determined in water solution both with and without the addition of the plant nutrient compound for a copolymer of vinyl acetate and the mono-methyl ester of maleic acid (A), the sodium salt of hydrolyzed polyacrylonitrile (B), the calcium salt of hydrolyzed polyacrylonitrile solubilized with a half-molar proportion of sodium carbonate (C), and the half-ammonium-half amide salt of the copolymer of isobutylene and maleic anhydride (D). The following table sets forth the observed aggregations and the percentages of increase or reduction in aggregation caused by the addition of the plant nutrient. In this table the negative values represent improvements in aggregation.

Table

| Fertilizer Component at 0.02% | (A) at 0.02% | | (B) at 0.05% | | (C) at 0.02% | | (D) at 0.01% | |
|---|---|---|---|---|---|---|---|---|
| | Agg., Percent | Dec., Percent | Agg., Percent | Dec., Percent | Agg., Percent | Dec., Percent | Agg., Percent | Dec., Percent |
| None (Ave. of 5) | 77 | | 66 | | 67 | | 77 | |
| $NH_4OH$ | 77 | (0) | 80 | (−20) | 68 | (0) | 69 | (10) |
| $Ca(H_2PO_4)_2 \cdot 2H_2O$ | 80 | (−4) | 70 | (−6) | 68 | (−1) | 82 | (−6) |
| $CaHPO_4$ | 79 | (−2) | 67 | (−1) | 69 | (−2) | 75 | (2) |
| $(NH_4)_3HPO_4$ | 80 | (−4) | 68 | (−3) | 70 | (−4) | 79 | (−2) |
| $NH_4(H_2PO_4)$ | 79 | (−2) | 73 | (−10) | 56 | (17) | 75 | (2) |
| $K_3PO_4$ | 78 | (−1) | 73 | (−10) | 69 | (−3) | 81 | (−5) |
| $K_2HPO_4 \cdot 3H_2O$ | 76 | (1) | 66 | (0) | 69 | (−3) | 78 | (−1) |
| $KH_2PO_4$ | 78 | (−1) | 66 | (0) | 66 | (1) | 80 | (−4) |
| $CaSO_4$ | 56 | (27) | 38 | (42) | 44 | (34) | 58 | (25) |
| $(NH_4)_2SO_4$ | 57 | (26) | 42 | (36) | 47 | (30) | 55 | (29) |
| $K_2SO_4$ | 59 | (23) | 45 | (32) | 45 | (33) | 59 | (23) |
| $Ca(NO_3)_2 \cdot 4H_2O$ | 62 | (19) | 41 | (38) | 48 | (28) | 53 | (31) |
| $NH_4NO_3$ | 56 | (27) | 36 | (45) | 42 | (37) | 49 | (36) |
| $KNO_3$ | 51 | (34) | 45 | (32) | 43 | (36) | 54 | (30) |
| $NaNO_3$ | 59 | (23) | 43 | (35) | 46 | (31) | 58 | (25) |
| KCl | 51 | (34) | 38 | (42) | 37 | (45) | 54 | (30) |

EXAMPLE 3

A series of mixtures were prepared from nutrient salts which did not have deleterious effects upon the soil aggregating properties of polyelectrolytes. These were mixed in equal parts by weight with a copolymer of vinyl acetate and the partial methyl ester of maleic acid and water solutions therefrom. The polyelectrolyte-nutrient solutions were used to aggregate soil by the above-described wet sieving technique using soil treated with polyelectrolytes without nutrients as a control. The following table sets forth the composition of the plant nutrients and the percentage of decrease in the activity of the polyelectrolyte in soil aggregation when used in water solution in the presence of the said nutrient.

Table

| Fertilizer Components, Percent | Nutrient Weight Ratio (in solid)— | | | Nitrogen Distribution, Percent of Total N From— | | Percent Dec. |
|---|---|---|---|---|---|---|
| | N | P₂O₅ | K₂O | Urea | NH₄ | |
| Monopotassium Phosphate, 22.1 Dipotassium Phosphate, 28.5 Urea, 49.4 | 23 | 23 | 23 | 100 | 0 | +1.9 |
| Diammonium Phosphate, 16.3 Monopotassium Phosphate, 52.3 Urea, 31.4 | 18 | 36 | 18 | 80 | 20 | [1] −37 |
| K₄P₂O₇, 29.9 Na₂H₂P₂O₇, 33.2 Urea, 36.9 | 17 | 34 | 17 | 100 | 0 | [1] >−15.0 |

[1] The negative values represent increase in aggregation.

EXAMPLE 4

Water solutions of the same polyelectrolytes used in Example 3 and nutrients were prepared using fertilizer mixtures containing a small proportion of nitrate. The following examples of these compositions demonstrate that only a minor loss in soil aggregation is attained, when substantially high phosphate content is present.

Table

| Fertilizer Components, Percent | Nutrient Weight Ratio (in solid)— | | | Nitrogen Distribution, Percent of Total N From— | | | Percent Dec. |
|---|---|---|---|---|---|---|---|
| | N | P₂O₅ | K₂O | Urea | NO₃ | NH₄ | |
| Monopotassium Phosphate, 47.5 Monosodium Phosphate, 13.8 NH₄NO₃, 14.1 Urea, 24.6 | 16 | 32 | 16 | 70 | 15 | 15 | +3.1 |
| Diammonium Phosphate, 7.7 Monopotassium Phosphate, 31.4 Monosodium Phosphate, 20.8 KNO₃, 11.8 Urea, 28.3 | 16 | 32 | 16 | 80 | 10 | 10 | +3.1 |

What we claim is:

1. A soil-conditioning fertilizer comprising an aqueous solution of a plurality of plant nutrient compounds and synthetic water-soluble polyelectrolyte having a weight average molecular weight of at least 10,000, and the structure derived by the polymerization of at least one monoolefinic compound through the aliphatic unsaturated group, said nutrients being substantially free of nitrate, chloride and sulfate.

2. A soil-conditioning fertilizer comprising an aqueous solution of a plurality of plant nutrient compounds and synthetic water-soluble polyelectrolyte having a weight average molecular weight of at least 10,000, and the structure derived by the polymerization of at least one monoolefinic compound through the aliphatic unsaturated group, said nutrients being substantially free of chloride and sulfate and having at least four times by weight as much phosphate (calculated as P₂O₅) as nitrate (calculated as nitrogen).

3. A soil-conditioning fertilizer comprising an aqueous solution of a plurality of plant nutrient compounds and synthetic water-soluble polyelectrolyte having a weight average molecular weight of at least 10,000, and the structure derived by the polymerization of at least one monoolefinic compound through the aliphatic unsaturated group, said nutrients being substantially free of chloride and sulfate and having from eight to 25 times as much phosphate (calculated as P₂O₅) as nitrate (calculated as nitrogen).

4. A soil-conditioning fertilizer comprising an aqueous solution of a plurality of plant nutrient compounds and synthetic water-soluble polyelectrolyte having a weight average molecular weight of at least 10,000, and the structure derived by the polymerization of at least one monoolefinic compound through the aliphatic unsaturated group, said nutrients being selected from the compounds of the class consisting of the potassium phosphates, the ammonium phosphates, the calcium phosphates, the sodium phosphates, ammonium hydroxide and urea.

5. A soil-conditioning fertilizer comprising an aqueous solution of plant nutrients and a synthetic polymeric water-soluble polyelectrolyte having an average molecular weight greater than 15,000, and having a structure derived by the polymerization of at least one monoolefinic compound through the aliphatic unsaturated group, said nutrients being compounds of nitrogen, phosphorus and potassium which are substantially free of nitrate, chloride and sulfate.

6. A soil-conditioning fertilizer comprising an aqueous solution of plant nutrients and a synthetic polymeric water-soluble polyelectrolyte having an average molecular weight greater than 15,000, and having a structure derived by the polymerization of at least one monoolefinic compound through the aliphatic unsaturated group, said nutrients being compounds of nitrogen, phosphorus and potassium which are substantially free of chloride and sulfate and having at least four times by weight as much phosphate (calculated as P₂O₅) as nitrate (calculated as nitrogen).

7. A soil-conditioning fertilizer comprising an aqueous solution of plant nutrients and a synthetic polymeric water-soluble polyelectrolyte having an average molecular weight greater than 15,000, and having a structure derived by the polymerization of at least one monoolefinic compound through the aliphatic unsaturated group, said nutrients being compounds of nitrogen, phosphorus and potassium which are substantially free of chloride and sulfate and having from eight to 25 times as much phosphate (calculated as P₂O₅) as nitrate (calculated as nitrogen).

8. A soil-conditioning fertilizer comprising an aqueous solution of a plurality of plant nutrient compounds selected from the group consisting of nitrogen containing compounds, phosphoric acid salts and potassium salts and a high molecular weight synthetic polymer containing a substantially linear molecular chain derived by the polymerization of at least one monoolefinic compound through aliphatic unsaturation, said molecular chain having a number of ionizable substituents such as to render the polymer water-soluble, said nutrients being substantially free of nitrate, chloride and sulfate.

9. A soil-conditioning fertilizer comprising an aqueous solution of a plurality of plant nutrient compounds selected from the group consisting of nitrogen containing compounds, phosphoric acid salts and potassium salts and a high molecular weight synthetic polymer containing a substantially linear molecular chain derived by the polymerization of at least one monoolefinic compound through aliphatic unsaturation, said molecular chain having a number of ionizable substituents such as to render the polymer water-soluble, said nutrients being substantially free of chloride and sulfate and having at least four times by weight as much phosphate (calculated at P₂O₅) as nitrate (calculated as nitrogen).

10. A soil-conditioning fertilizer comprising an aqueous solution of a plurality of plant nutrient compounds selected from the group consisting of nitrogen containing compounds, phosphoric acid salts and potassium salts and a high molecular weight synthetic polymer containing a substantially linear molecular chain derived by the polymerization of at least one monoolefinic compound through aliphatic unsaturation, said molecular chain having a number of ionizable substituents such as to render the polymer water-soluble, said nutrients being substantially free of chloride and sulfate and having from eight to 25 times as much phosphate (calculated as P₂O₅) as nitrate (calculated as nitrogen).

11. A soil-conditioning fertilizer comprising an aqueous solution of plant nutrients and a synthetic water-soluble polyelectrolyte having a structure derived by polymerization of at least one compound characterized by the presence of a single aliphatic carbon to carbon unsaturated group, and having a molecular weight such as to improve the water-stability of aggregates in the said soil, said nutrients being compounds of nitrogen, phosphorus and potassium which are substantially free of nitrate, chloride and sulfate.

12. A soil-conditioning fertilizer comprising an aqueous solution of plant nutrients and a synthetic water-soluble polyelectrolyte characterized by the presence of a single aliphatic carbon to carbon unsaturated group, and having a molecular weight such as to improve the water-stability of aggregates in the said soil, said nutrients being compounds of nitrogen, phosphorus and potassium which are substantially free of chloride and sulfate and having at least four times by weight as much phosphate (calculated as $P_2O_5$) as nitrate (calculated as nitrogen).

13. A soil-conditioning fertilizer comprising an aqueous solution of plant nutrients and a synthetic water-soluble polyelectrolyte characterized by the presence of a single aliphatic carbon to carbon unsaturated group, and having a molecule weight such as to improve the water-stability of aggregates in the said soil, said nutrients being compounds of nitrogen, phosphorus and potassium which are substantially free of chloride and sulfate and having from eight to 25 times as much phosphate (calculated as $P_2O_5$) as nitrate (calculated as nitrogen).

14. The soil-conditioning fertilizer defined by claim 2 wherein the polyelectrolyte is a calcium salt of a hydrolyzed polymer of acrylonitrile.

15. The soil-conditioning fertilizer defined by claim 2 wherein the polyelectrolyte is a sodium salt of a hydrolyzed polymer of acrylonitrile.

16. The soil-conditioning fertilizer defined by claim 2 wherein the polyelectrolyte is a copolymer having the structure of a copolymer of vinyl acetate and the reaction product formed by partially esterifying maleic anhydride with methyl alcohol.

17. The soil-conditioning fertilizer defined by claim 2 wherein the polyelectrolyte is a copolymer having the structure of an ammonium salt of a copolymer of isobutylene and maleic acid.

18. The soil-conditioning fertilizer defined by claim 2 wherein the polyelectrolyte is a copolymer of vinyl acetate and maleic anhydride.

References Cited in the file of this patent

UNITED STATES PATENTS 2,625,471     Mowry et al.     Jan. 13, 1953